(12) United States Patent
Yoshida

(10) Patent No.: US 10,237,422 B2
(45) Date of Patent: Mar. 19, 2019

(54) IMAGE DISPLAY DEVICE, IMAGE DISPLAY METHOD, AND PROGRAM DISPLAYING COMPOSITE IMAGE OF ONE PAGE THAT IS BEING EDITED

(71) Applicant: FUJIFILM Corporation, Tokyo (JP)

(72) Inventor: Masako Yoshida, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/678,341

(22) Filed: Aug. 16, 2017

(65) Prior Publication Data

US 2018/0084119 A1 Mar. 22, 2018

(30) Foreign Application Priority Data

Sep. 16, 2016 (JP) ................ 2016-182020

(51) Int. Cl.
G06F 3/12 (2006.01)
G06K 9/18 (2006.01)
G06T 3/40 (2006.01)
H04N 1/00 (2006.01)
H04N 9/74 (2006.01)
G03B 27/46 (2006.01)
G03G 15/36 (2006.01)
G11B 27/32 (2006.01)
H04N 1/387 (2006.01)
G11B 27/028 (2006.01)
G11B 27/036 (2006.01)

(52) U.S. Cl.
CPC ......... H04N 1/00196 (2013.01); G03B 27/46 (2013.01); G11B 27/028 (2013.01); G11B 27/036 (2013.01); G11B 27/327 (2013.01); H04N 9/74 (2013.01); G03G 15/36 (2013.01); G06F 3/1242 (2013.01); G06K 9/18 (2013.01); G06T 3/4038 (2013.01); H04N 1/00185 (2013.01); H04N 1/387 (2013.01); H04N 1/3871 (2013.01)

(58) Field of Classification Search
None
See application file for complete search history.

(56) References Cited

U.S. PATENT DOCUMENTS

| | | | |
|---|---|---|---|
| 2005/0141849 A1 | 6/2005 | Tsue et al. | |
| 2006/0048069 A1* | 3/2006 | Igeta | G06F 3/0486 715/769 |
| 2006/0200758 A1* | 9/2006 | Atkins | G06T 11/60 715/209 |
| 2009/0116752 A1* | 5/2009 | Isomura | G06F 17/30265 382/217 |

(Continued)

FOREIGN PATENT DOCUMENTS

| | | |
|---|---|---|
| JP | 2005-184795 A | 7/2005 |
| JP | 2011-075995 A | 4/2011 |

Primary Examiner — Miya J Williams
(74) Attorney, Agent, or Firm — Studebaker & Brackett PC

(57) ABSTRACT

An image display device includes a command receiving unit that receives a command to display one page and a display control unit that displays a composite image on the indicated one page and a list of a plurality of image groups associated with the plurality of pages on a display unit at the same time. The display control unit distinctively displays two or more image groups among the plurality of image groups in the list and preferentially displays an image group associated with the one page in the list.

19 Claims, 14 Drawing Sheets

(56) References Cited

U.S. PATENT DOCUMENTS

| | | | |
|---|---|---|---|
| 2009/0158183 A1* | 6/2009 | McCurdy | G06F 17/30265 715/764 |
| 2009/0287996 A1* | 11/2009 | Norimatsu | G06T 11/00 715/243 |
| 2011/0219297 A1* | 9/2011 | Oda | G06F 17/24 715/246 |
| 2012/0151332 A1* | 6/2012 | Kaneko | G06F 3/1208 715/253 |
| 2013/0004073 A1* | 1/2013 | Yamaji | G06T 11/60 382/173 |
| 2013/0132444 A1* | 5/2013 | Chen | G06F 17/3028 707/804 |
| 2014/0281965 A1* | 9/2014 | Yamaji | G06F 3/04817 715/708 |
| 2016/0078322 A1* | 3/2016 | Yamaji | G06T 7/97 382/224 |
| 2016/0139761 A1* | 5/2016 | Grosz | G06F 3/1243 715/769 |

* cited by examiner ism IMAGE DISPLAY DEVICE, IMAGE DISPLAY
METHOD, AND PROGRAM DISPLAYING
COMPOSITE IMAGE OF ONE PAGE THAT
IS BEING EDITED

CROSS-REFERENCE TO RELATED APPLICATIONS

The present application claims priority under 35 U.S.C. § 119 to Japanese Patent Application No. 2016-182020, filed on Sep. 16, 2016. Each of the above application(s) is hereby expressly incorporated by reference, in its entirety, into the present application.

BACKGROUND OF THE INVENTION

1. Field of the Invention

The present invention relates to an image display device, an image display method, and a computer-readable non-transitory recording medium storing a program that can easily instruct the replacement of images inserted into a composite image of one page among a plurality of pages with not only images associated with the one page but also images associated with other pages different from the one page.

2. Description of the Related Art

In the related art, a plurality of images captured by, for example, a digital camera or a smart phone are collected and digital content (hereinafter, referred to as an "image album") including a plurality of pages is created and used. It is possible to print the created image album so as to be viewed and to display the created image album on a display device so as to be viewed. The image album is called, for example, an "album", a "book", and a "collection". In some cases, the image album is called, for example, a "calendar" and a "slide show" according to the purpose of use or a browsing aspect.

A device has been proposed which displays an editing screen to support an editing operation when an image album is created.

JP2011-75995A discloses a technique which displays, as an editing screen, a list of captured images and two facing pages that are being edited, receives an operation of dropping the captured image in the list to a desired position of the two facing pages, and supports an operation of allocating the captured images to every two facing pages. In addition, JP2011-75995A discloses a technique which displays the captured image list such that the captured images are classified into groups corresponding to each captured scene in a case in which an editing screen is switched to an allocation change screen (a list display screen for an image replacement operation).

JP2005-184795A discloses a technique which stores information indicating the relationship between a page and a scene, classifies a plurality of images into scenes, and displays a page that is being edited and a list of image groups classified into a scene corresponding to the page that is being edited, on the basis of the stored information and the classification result of the images, in order to enable an operator to easily select an image to be inserted into a template from a plurality of images. In addition, JP2005-184795A discloses a technique which displays an image group classified into a scene corresponding to the page that is being edited and N images that are adjacent to the image group in chronological order at the same time and gives colors to background portions of the N adjacent images to distinctively highlight an image group of the scene corresponding to the page that is being edited such that a separation position for the classification of images can be easily changed in response to a command from the operator.

SUMMARY OF THE INVENTION

However, when an operation (hereinafter, also referred to as an "image replacement operation") of replacing an image in an image album including a plurality of pages is performed, an operation of instructing the replacement of an image inserted into a composite image on the page that is being edited with an image associated with another page different from the page that is being edited is complicated for the user.

In the structure disclosed in JP2011-75995A, in a case in which there are many captured images, even when the screen is switched to a screen used only for the display of a list to display all of replaceable images, the user forgets to replace an image since the page that is being edited is not viewed and it is difficult for the user to instruct the replacement of an image inserted into a composite image on the page that is being edited with an image suitable for the page that is being edited.

In the structure disclosed in JP2005-184795A, the page that is being edited and a list of the images automatically classified into the scene corresponding to the page that is being edited are displayed at the same time. Therefore, even in a case in which there are many captured images, it is possible to instruct the replacement of an image inserted into a composite image on the page that is being edited with an image in a list of the image groups which are determined to correspond to the page that is being edited. However, an operation of changing the separation position for classification needs to be performed to instruct the replacement of the image inserted into the composite image on the page that is being edited with an image which is determined not to correspond to the page that is being edited, or it is necessary to switch to the screen used only for the display of a list as disclosed in JP2011-75995A.

For example, in a case in which the user wants to create a page with a food theme using a plurality of images that are automatically classified regardless of food, the instruction of the image replacement operation is likely to be complicated. In addition, in a case in which images are captured by a plurality of imaging apparatuses and clocks of the imaging apparatuses are not synchronized, that is, in a case in which there is an external factor that reduces the accuracy of automatically classifying images, the instruction of the image replacement operation is likely to be complicated.

An object of the invention is to provide an image display device, an image display method, and a computer-readable non-transitory recording medium storing a program that can easily instruct the replacement of images inserted into a composite image of one page among a plurality of pages with not only images associated with the one page but also images associated with other pages different from the one page.

In order to achieve the object, according to a first aspect of the invention, there is provided an image display device comprising: a display unit; a first command receiving unit that receives a command to display one page among a plurality of pages; and a display control unit that displays a composite image of the one page indicated by the first command receiving unit and a list of a plurality of image groups associated with the plurality of pages on the display unit at the same time. The display control unit distinctively displays two or more image groups among the plurality of image groups in the list and preferentially displays an image group associated with the one page in the list.

According to this aspect, the composite image of the indicated one page and a list of the image groups are displayed on the display unit at the same time. In addition, two or more image groups are distinctively displayed in the list and the image group associated with the indicated one page is preferentially displayed in the list. Therefore, it is possible to easily designate both an image associated with one page among a plurality of pages and an image associated with another page different from the one page.

According to a second aspect of the invention, in the image display device, the display control unit may display composite images of pages with page numbers adjacent to the page number of the one page so as to be adjacent to the composite images of the one page.

According to a third aspect of the invention, in the image display device, in a case in which the first command receiving unit receives a command to display another page different from the one page, the display control unit may switch display from a state in which the composite image of the one page is displayed and an image group associated with the one page is preferentially displayed in the list to a state in which a composite image of another page is displayed and an image group associated with another page is preferentially displayed in the list.

According to a fourth aspect of the invention, in the image display device, the display control unit may display a mark corresponding to each page among the plurality of pages and the first command receiving unit may receive a command for the mark corresponding to each page among the plurality of pages to receive a command to display the page corresponding to the mark indicated by the command.

According to a fifth aspect of the invention, the image display device may further comprise a second command receiving unit that receives a command to scroll the list page by page. The display control unit may display the image group in the list so as to be scrolled page by page in response to the page-by-page scroll command received by the second command receiving unit.

According to a sixth aspect of the invention, in the image display device, the display control unit may display boundary lines that separate the image group into pages in the list.

According to a seventh aspect of the invention, in the image display device, the display control unit may distinctively display an image that has been inserted into a composite image of any one of the plurality of pages and an image that has not been inserted into any of the plurality of pages in the list and may distinctively display an image that has been inserted into the composite image of the one page and an image that has been inserted into a composite image of another page different from the one page in the list.

According to an eighth aspect of the invention, the image display device may further comprise an image evaluation unit that analyzes each of a plurality of images to calculate an evaluation value of each image. The display control unit may distinctively displays an image having an evaluation value in a prescribed range and an image having an evaluation value beyond the prescribed range in the list.

According to a ninth aspect of the invention, the image display device may further comprise an image editing unit that edits the composite image of the one page.

According to a tenth aspect of the invention, the image display device may further comprise a third command receiving unit that receives an image replacement command for the composite image of the one page. In a case in which the third command receiving unit receives a command to replace an image in the composite image of the one page with an image associated with another page different from the one page, the image editing unit may remove the image inserted into the composite image of the one page and insert the image associated with another page into the composite image of the one page.

According to an eleventh aspect of the invention, the image display device may further comprise a fourth command receiving unit that receives a re-layout command for the composite image. The image editing unit may rearrange the images in the composite image of each page in response to the re-layout command received by the fourth command receiving unit.

According to a twelfth aspect of the invention, the image display device may further comprise a fifth command receiving unit that receives a group editing command for the image group and a group editing unit that edits association between the page and images in the image group for each page in response to the group editing command received by the fifth command receiving unit.

According to a thirteenth aspect of the invention, the image display device may further comprise a sixth command receiving unit that receives an editing screen switching command to switch an editing screen between a first editing screen on which the composite image of the one page and the list of the image groups associated with the one page are displayed at the same time and a second editing screen on which the composite image of the one page and the list of the plurality of image groups are displayed at the same time. A display size of the composite image of the one page in the second editing screen may be less than a display size of the composite image of the one page in the first editing screen. A display size of the list of the plurality of image groups in the second editing screen may be greater than a display size of the list of the image groups associated with the one page in the first editing screen. The display control unit may change a ratio of the display size of the composite image of the one page to the display size of the list of the image groups associated with the one page in the first editing screen and a ratio of the display size of the composite image of the one page to the display size of the list of the plurality of image groups in the second editing screen, in response to the editing screen switching command.

According to a fourteenth aspect of the invention, in the image display device, the display control unit may display the image group associated with the one page at a leading position of the list in one direction on a screen of the display unit to preferentially display the image group associated with the one page in the list.

According to a fifteenth aspect of the invention, in the image display device, the display control unit may make at least one of a display mode of the image group associated with the one page or a display mode of a background of the image group different from a display mode of an image group associated with another page different from the one page or a display mode of a background of the image group to preferentially display the image group associated with the one page in the list.

According to a sixteenth aspect of the invention, in the image display device, a unit of the page may be two facing pages or a single page.

According to a seventeenth aspect of the invention, there is provided an image display method comprising: receiving a command to display one page among a plurality of pages; and displaying a composite image of the one page and a list of a plurality of image groups associated with each of the plurality of pages at the same time. In the display of the composite image and the list, two or more image groups among the plurality of image groups are distinctively displayed in the list and an image group associated with the one page is preferentially displayed in the list.

According to an eighteenth aspect of the invention, there is provided a computer-readable non-transitory recording medium storing a program that causes a computer to perform: receiving a command to display one page among a plurality of pages; and displaying a composite image of the one page and a list of a plurality of image groups associated with each of the plurality of pages at the same time. In the display of the composite image and the list, two or more image groups among the plurality of image groups are distinctively displayed in the list and an image group associated with the one page is preferentially displayed in the list.

According to the invention, it is possible to easily instruct the replacement of images of a page that is being edited among a plurality of pages with not only images associated with the page that is being edited but also images associated with another page different from the page that is being edited.

DESCRIPTION OF THE PREFERRED EMBODIMENTS

Hereinafter, embodiments of an image display device, an image display method, and a computer-readable non-transitory recording medium storing a program according to the invention will be described with reference to the accompanying drawings.

Figure 1:
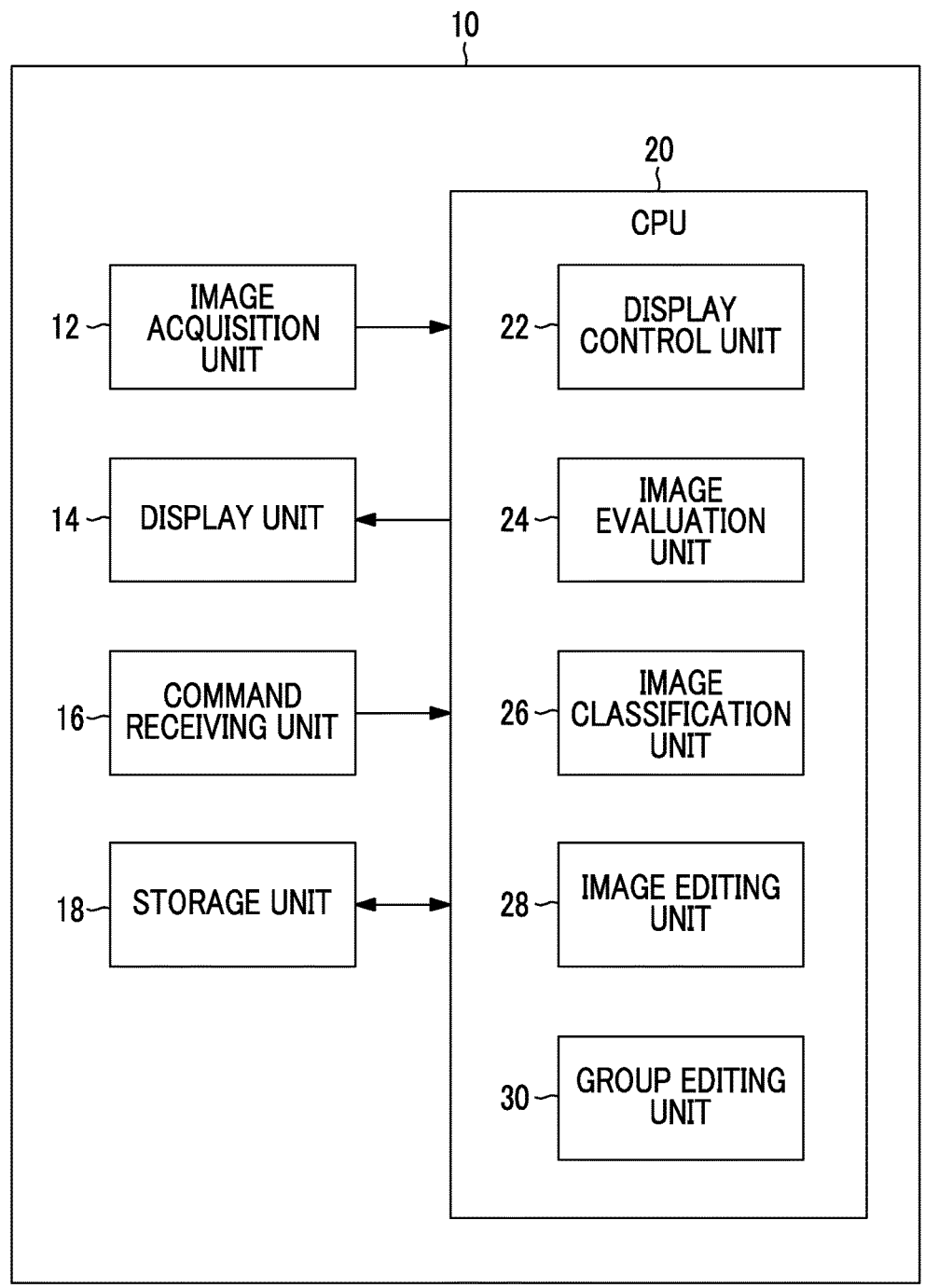
FIG. 1 is a block diagram illustrating an example of an image composition device to which an image display device according to the invention is applied.

FIG. 1 is a block diagram illustrating an example of an image composition device to which the image display device according to the embodiment of the invention is applied.

In this example, an image composition device 10 is formed by a computer device. Examples of the computer device include a personal computer, a tablet terminal, or a smart phone. Other computer devices may be used.

The image composition device 10 includes an image acquisition unit 12 that acquires a plurality of images, a display unit 14 that can display an image, a command receiving unit 16 that receives a command from a user, a storage unit 18 that stores a program and information required to execute the program, and a central processing unit (CPU) 20 that executes the program.

The image acquisition unit 12 can be formed by a device that inputs digital signals. For example, a communication device that performs wireless communication or wired communication can be used as the device. A device that can acquire an image from a storage medium, such as a memory card, may be used.

The display unit 14 is formed by a display device such as a liquid crystal display device.

The command receiving unit 16 can be formed by, for example, a touch panel. A keyboard and a mouse may be used or other user interfaces may be used. A voice input device may be used.

The storage unit 18 is formed by a temporary storage device, such as a random access memory (RAM), and a non-transitory storage device, such as an electrically erasable programmable read only memory (EEPROM).

The CPU 20 includes a display control unit 22 that controls the display unit 14, an image evaluation unit 24 that analyzes each of the plurality of images acquired by the image acquisition unit 12 to calculate an evaluation value of each image, an image classification unit 26 that classifies the plurality of acquired images into a plurality of image groups (hereinafter, also referred to as "groups") so as to be associated with each of a plurality of pages of an image album, an image editing unit 28 that edits a composite image on each page, and a group editing unit 30 that automatically edits the association between a page and an image for each page.

An example of an editing screen that is displayed on the display unit 14 under the control of the display control unit 22 will be described.

Figure 2:
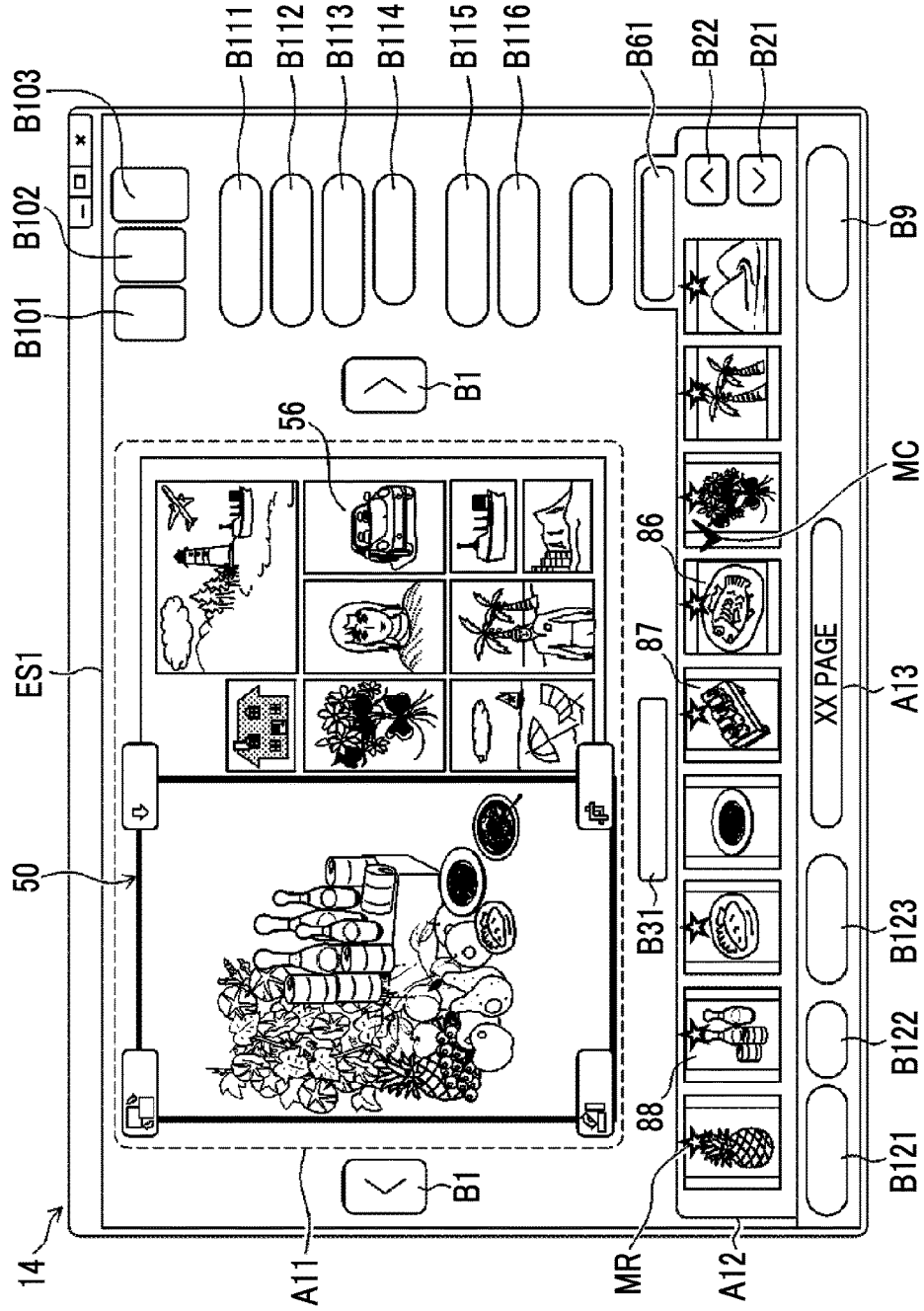
FIG. 2 is a diagram illustrating an example of a first editing screen.

FIG. 2 is a diagram illustrating a first editing screen ES1. The first editing screen ES1 is provided with a first composite image display region A11 in which a composite image 50 of one page that is being edited (hereinafter, referred to as a "page that is being edited") among a plurality of pages of an album to be created (an example of the image album) is displayed, a first list display region A12 in which a list of image groups (hereinafter, referred to as "page-being-edited image groups") associated with the page that is being edited is displayed, and a page information display region A13 in which information related to the page that is being edited is displayed.

The unit of the "page" may be two facing pages or a single page. In addition, the unit of the page may be a mixture of the two facing pages and the single page.

The composite image is a page-size image and is generally generated by arranging an image that is acquired as a front image by the image acquisition unit 12 on a template image which is a rear image. The embodiment of the invention includes a case in which the template image is white paper. The template image may not be used and a plurality of images acquired by the image acquisition unit 12 may be combined to generate a composite image.

The first editing screen ES1 is provided with a page designation button B1 (first command receiving unit) that receives a command to display one page among a plurality of images in an album, scroll command buttons B21 and B22 that receive a command to scroll the page-being-edited image groups displayed in the first list display region A12, a button B31 that instructs the replacement (substitution) of an image, a first editing screen switching command button B61 that receives an editing screen switching command, and an editing end command button B9 that receives an editing end command. In addition, the first editing screen ES1 is provided with a list screen command button B101, an editing screen command button B102, an enlargement command button B103, a date display command button B111, a layout change command button B112, a background color change command button B113, a color correction command button B114, a comment input command button B115, a group editing command button B116, a first return command button B121 that receives a command to return to an initial state, a second return command button B122 that receives a command to return to a previous state, and a temporary storage command button B123. In the first editing screen ES1, when the page designation button B1 receives a command to display one page among a plurality of pages, pages with page numbers adjacent to the page number of the page that is being edited are displayed. In the first editing screen ES1, an operation for the editing screen command button B102 is invalidated. Alternatively, the editing screen command button B102 is used to redisplay the first editing screen ES1.

Figure 3:
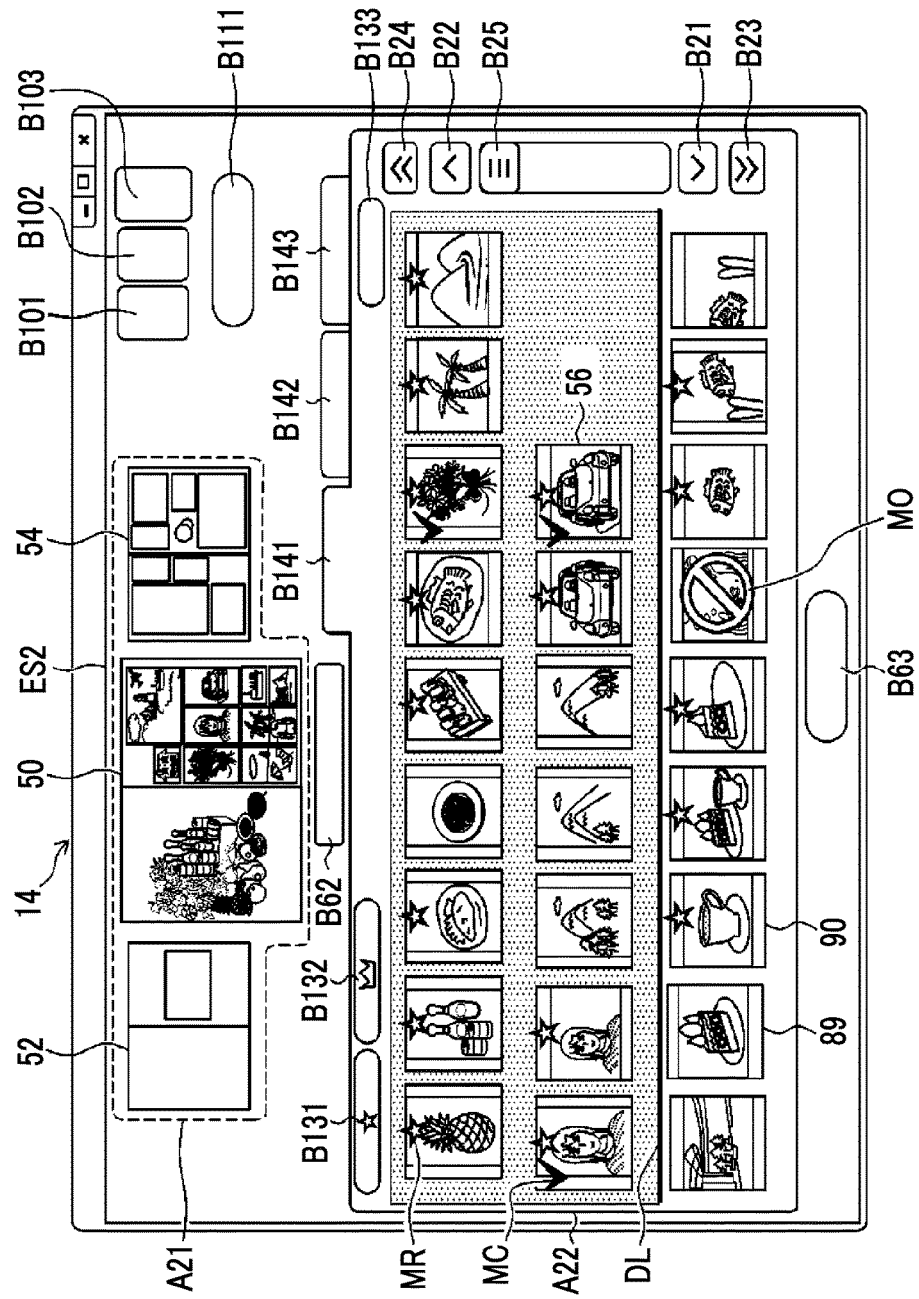
FIG. 3 is a diagram illustrating an example of a second editing screen.

FIG. 3 is a diagram illustrating a second editing screen ES2. The second editing screen ES2 is provided with a second composite image display region A21 in which the composite image 50 of the page that is being edited and composite images 52 and 54 on pages (hereinafter, referred to as "adjacent pages") with page numbers adjacent to the page number of the page that is being edited are displayed and a second list display region A22 in which a list of a plurality of image groups associated with a plurality of pages is displayed. In this example, the display control unit 22 visibly displays the image groups on all of the pages in response to the operation of the scroll command buttons B21, B22, B23, B24, and B25.

The second editing screen ES2 is provided with row-by-row scroll command buttons B21 and B22 that receive a command to scroll the list line by line, page-by-page scroll command buttons B23 and B24 (second command receiving unit) that receive a command to scroll the list page by page, and a slight scroll command button B25 that receives a slight scroll command as scroll command buttons.

In addition, the second editing screen ES2 is provided with second editing screen switching command buttons B62 and B63 that receive an editing screen switching command, a list screen command button B101, an editing screen command button B102, an enlargement command button B103, a date display command button B111, a recommended image list display command button B131 that receives a command to display only a list of recommended images, a main person image list display command button B132 that receives a command to display only a list of images including the main object (this example, a main person), an image addition command button B133, a classified image list display command button B141, an unclassified image list display command button B142, and an additional image list display command button B143. In the second editing screen ES2, an operation for the editing screen command button B102 and the classified image list display command button B141 is invalidated. Alternatively, the editing screen command button B102 and the classified image list display command button B141 are used to redisplay the second editing screen ES2.

In the first editing screen ES1, the area of the first composite image display region A11 is greater than 50% of the area of the screen of the display unit 14 and the area of the first list display region A12 is less than 50% of the area of the screen of the display unit 14. In the second editing screen ES2, the area of the second composite image display region A21 is less than 50% of the area of the screen of the display unit 14 and the area of the second list display region A22 is greater than 50% of the area of the screen of the display unit 14.

In a case in which the first editing screen switching command button B61 is operated on the first editing screen ES1 illustrated in FIG. 2, the first editing screen ES1 is switched to the second editing screen ES2 illustrated in FIG. 3. In a case in which the second editing screen switching command button B62 or B63 is operated on the second editing screen ES2, the second editing screen ES2 is switched to the first editing screen ES1. That is, in this example, the first editing screen switching command button B61 and the second editing screen switching command buttons B62 and B63 form a command receiving unit (sixth command receiving unit) that receives an editing screen switching command to switch the editing screen between the first editing screen ES1 and the second editing screen ES2. The display control unit 22 changes the ratio of the display size of the composite image 50 to the display size of a list of the page-being-edited image groups on the first editing screen ES1 and the ratio of the display size of the composite image 50 to the display size of a list of a plurality of image groups associated with each of the plurality of pages on the second editing screen ES2, in response to the editing screen switching command.

That is, in a case in which the first editing screen ES1 is switched to the second editing screen ES2, the display size of the composite image decreases and the display size of the list of the image groups increases. In a case in which the second editing screen ES2 is switched to the first editing screen ES1, the display size of the composite image increases and the display size of the list decreases.

Figure 4:
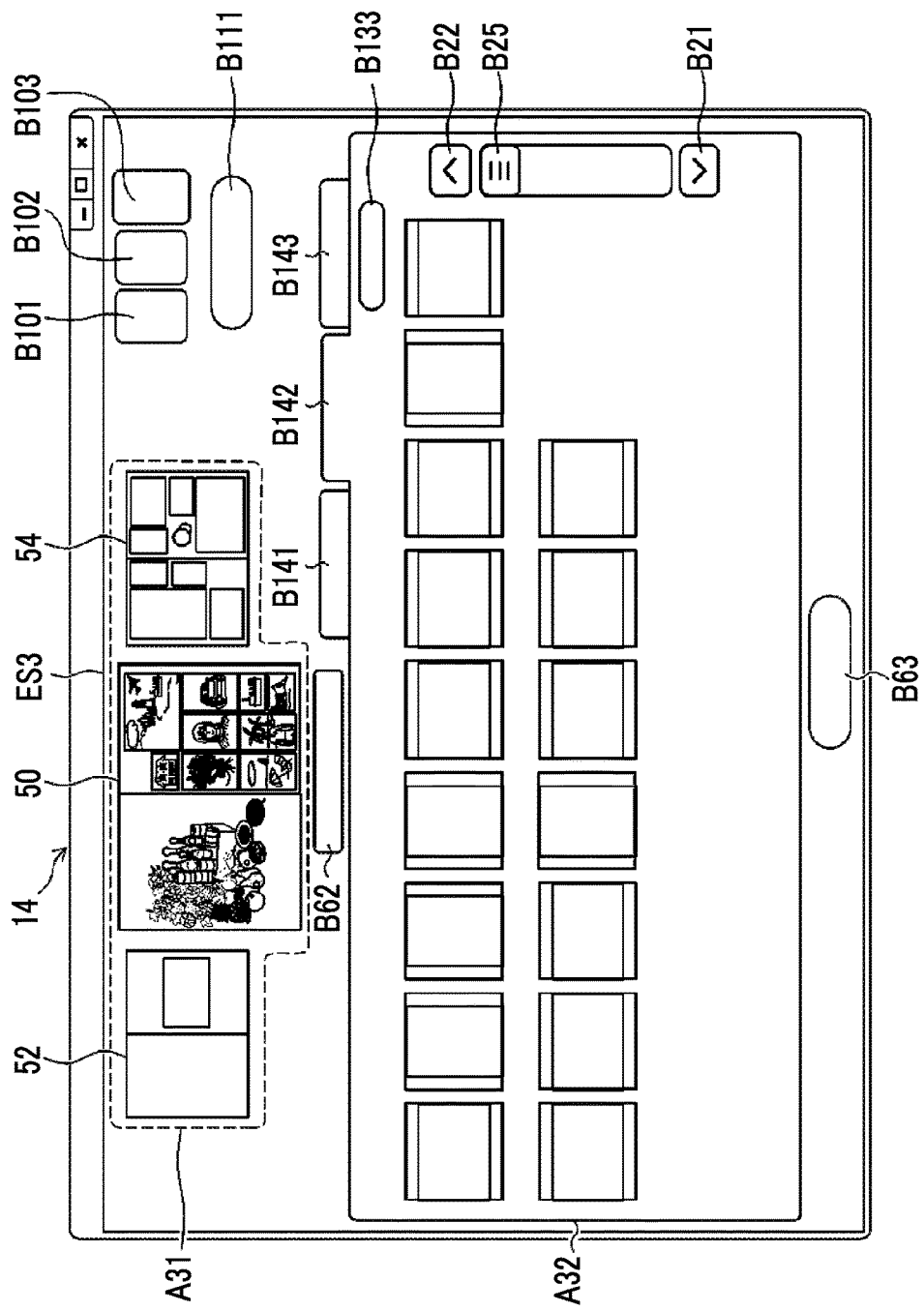
FIG. 4 is a diagram illustrating an example of a third editing screen.

FIG. 4 is a diagram illustrating a third editing screen ES3. The third editing screen ES3 is displayed in a case in which the unclassified image list display command button B142 is operated (that is, the unclassified image list display command is received) on the second editing screen ES2 illustrated in FIG. 3 or a fourth editing screen ES4 illustrated in FIG. 5 which will be described below. The third editing screen ES3 is provided with a third composite image display region A31 in which the composite image 50 of the page that is being edited and the composite images 52 and 54 on adjacent pages are displayed and a third list display region A32 in which a list of unclassified images is displayed. Similarly to the second editing screen ES2, the third editing screen ES3 is provided with the scroll command buttons B21, B22, and B25, the second editing screen switching command buttons B62 and B63, the list screen command button B101, the editing screen command button B102, the enlargement command button B103, the date display command button B111, the image addition command button B133, the classified image list display command button B141, the unclassified image list display command button B142, and the additional image list display command button B143. An operation for the editing screen command button B102 and the unclassified image list display command button B142 is invalidated. Alternatively, the editing screen command button B102 and the unclassified image list display command button B142 are used to redisplay the third editing screen ES3.

Figure 5:
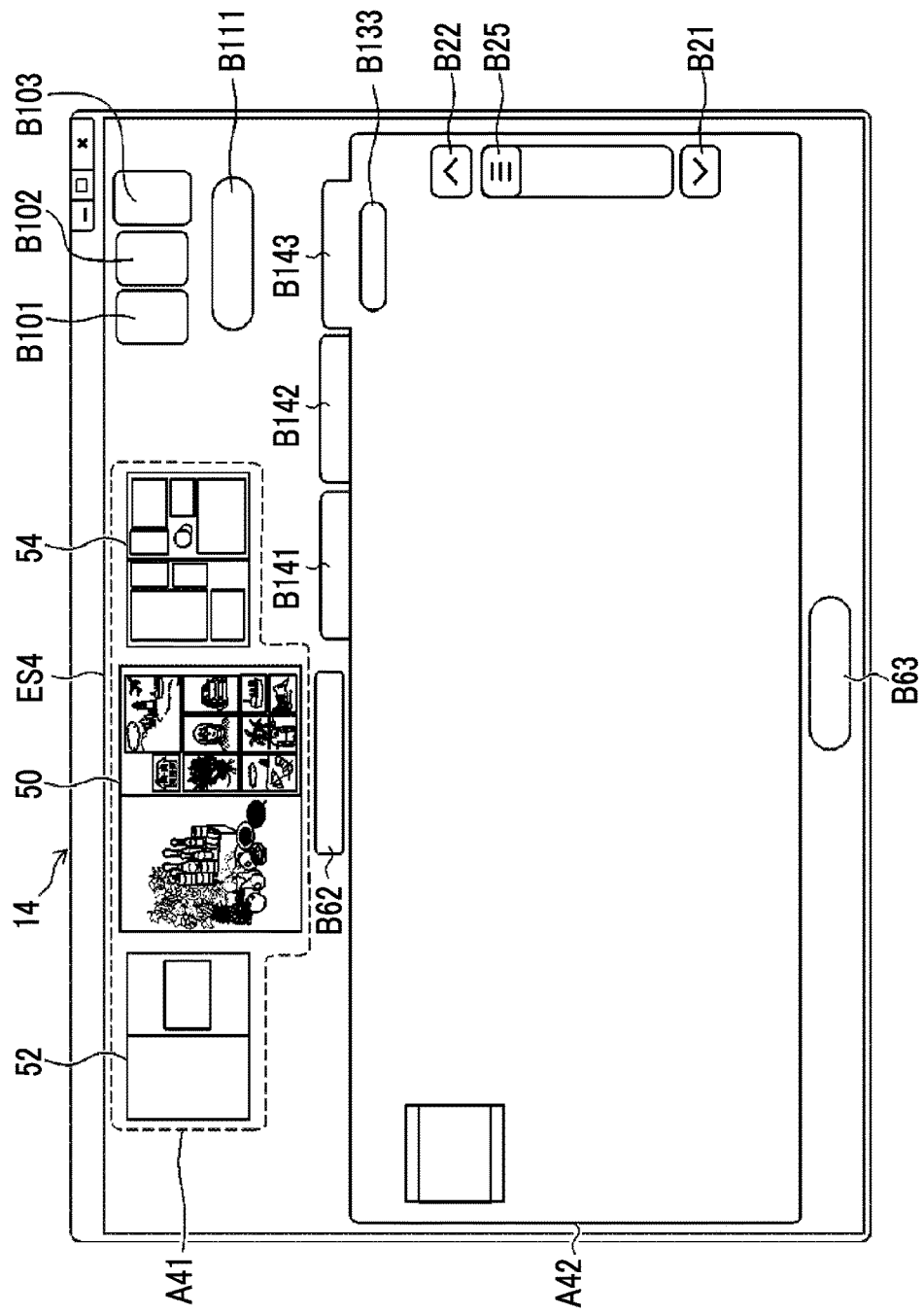
FIG. 5 is a diagram illustrating an example of a fourth editing screen.

FIG. 5 is a diagram illustrating the fourth editing screen ES4. The fourth editing screen ES4 is displayed in a case in which the additional image list display command button B143 is operated (that is, the additional image list display command is received) on the second editing screen ES2 illustrated in FIG. 3 or the third editing screen ES3 illustrated in FIG. 4. The fourth editing screen ES4 is provided with a fourth composite image display region A41 in which the composite image 50 of the page that is being edited and the composite images 52 and 54 on adjacent pages are displayed and a fourth list display region A42 in which a list of additional images is displayed. The fourth editing screen ES4 is provided with the scroll command buttons B21, B22, and B25, the second editing screen switching command buttons B62 and B63, the list screen command button B101, the editing screen command button B102, the enlargement command button B103, the date display command button B111, the image addition command button B133, the classified image list display command button B141, the unclassified image list display command button B142, and the additional image list display command button B143 as the third editing screen ES3. An operation for the editing screen command button B102 and the additional image list display command button B143 is invalidated. Alternatively, the editing screen command button B102 and the additional image list display command button B143 are used to redisplay the fourth editing screen ES4.

A main display control process of the display control unit 22 on the editing screen (the first editing screen ES1, the second editing screen ES2, the third editing screen ES3, and the fourth editing screen ES4) will be described.

First, the main display control process on the first editing screen ES1 will be described.

The display control unit 22 switches a page to display the composite image 50 in response to the operation of the page designation button B1 (first command receiving unit). In addition, the display control unit 22 visibly displays all of the images (page-being-edited image group) associated with the page that is being edited in response to the operation of the scroll command buttons B21 to B25.

First, the display control unit 22 displays the image group (page-being-edited image group) associated with the page that is being edited in the first list display region A12.

Second, the display control unit 22 distinctively displays an image that has been inserted into the composite image on the page that is being edited and an image that has not been inserted in the first list display region A12. In this example, the display control unit 22 puts a check mark MC to the inserted image and displays the inserted image.

Third, the display control unit 22 distinctively displays an image having an evaluation value in a prescribed range and an image having an evaluation value beyond the prescribed range in the first list display region A12. In this example, the display control unit 22 puts a star-shaped recommendation mark MR to the image having an evaluation value in the prescribed range and displays the image.

Next, the main display control process on the second editing screen ES2 will be described.

First, the display control unit 22 distinctively displays a plurality of image groups (a plurality of page image groups) in the second list display region A22. In this example, the display control unit 22 displays boundary lines DL ("page breaks") that separate the image group into pages in the second list display region A22.

In this example, the display of a list of "a plurality of image groups" (image groups of a plurality of pages) means that all of the images in each of "two or more image groups" are reduced and displayed. Here, the "two or more image groups" may not be image groups associated with each of the pages of the image album and are image groups associated with at least two pages of the image album. The "two or more image groups" may be displayed in response to a scroll operation. In a case in which there many images, the "two or more image groups" may not be displayed at the same time. However, the image group list and the composite image 50 of the page that is being edited are displayed at the same time.

Second, the display control unit 22 preferentially displays the image group associated with the page that is being edited in the second list display region A22. In this example, the display control unit 22 arranges the image group associated with the page that is being edited among a plurality of image groups at the top of the list. That is, in this example, the display control unit 22 displays the image group associated with the page that is being edited at a leading position of the list in one direction on the screen of the display unit 14. The display control unit 22 displays the image group associated with the page that is being edited or the background of the image group associated with the page that is being edited so as to be highlighted. The display control unit 22 may make at least one of the display mode of the image group associated with the page that is being edited or the display mode of the background of the image group associated with the page that is being edited different from the display mode of an image group associated with another page different from the page that is being edited or the display mode of the background of the image group associated with another page different from the page that is being edited to preferentially display the image group associated with the page that is being edited in the list.

In the specification, the "preferential display" of the image group means that the image group is displayed with a higher visibility than other image groups according to, for example, a display position or by highlighting. In this example, the image composition device 10 preferentially displays the image group associated with the page that is being edited in the second list display region A22. According to this aspect, in a case in which an image inserted into a composite image on the page that is being edited is replaced with an image included in the image group associated with pages with page numbers adjacent to the page number of the page that is being edited, it is possible to easily view the image to be inserted. In many cases, the image that the user wants to insert into the composite image of the page that is being edited is included in the image group associated with the page that is being edited or the image group associated with pages with page numbers adjacent to the page number of the page that is being edited. In this case, in this example, since the image composition device 10 preferentially displays the image group associated with the page that is being edited in the second list display region A22, the user can easily view the image that the user wants to insert.

Third, the display control unit 22 displays the image group in the second list display region A22 so as to be scrolled page by page in a case in which the page-by-page scroll command buttons B23 and B24 (second command receiving unit) are operated, that is, the page-by-page scroll command is received.

Figure 6:
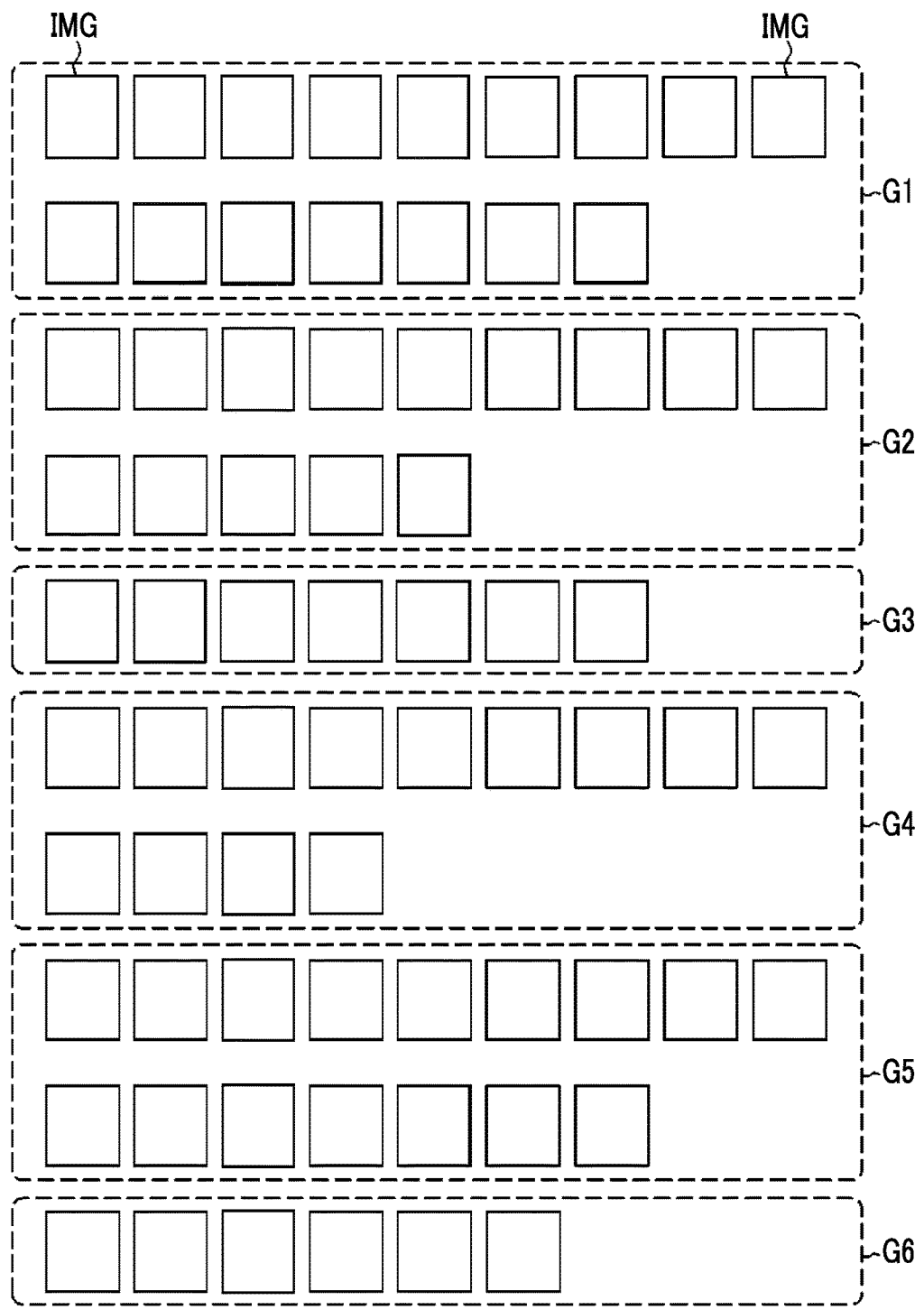
FIG. 6 is a diagram illustrating an example of the classification of a plurality of images.
Figure 7:
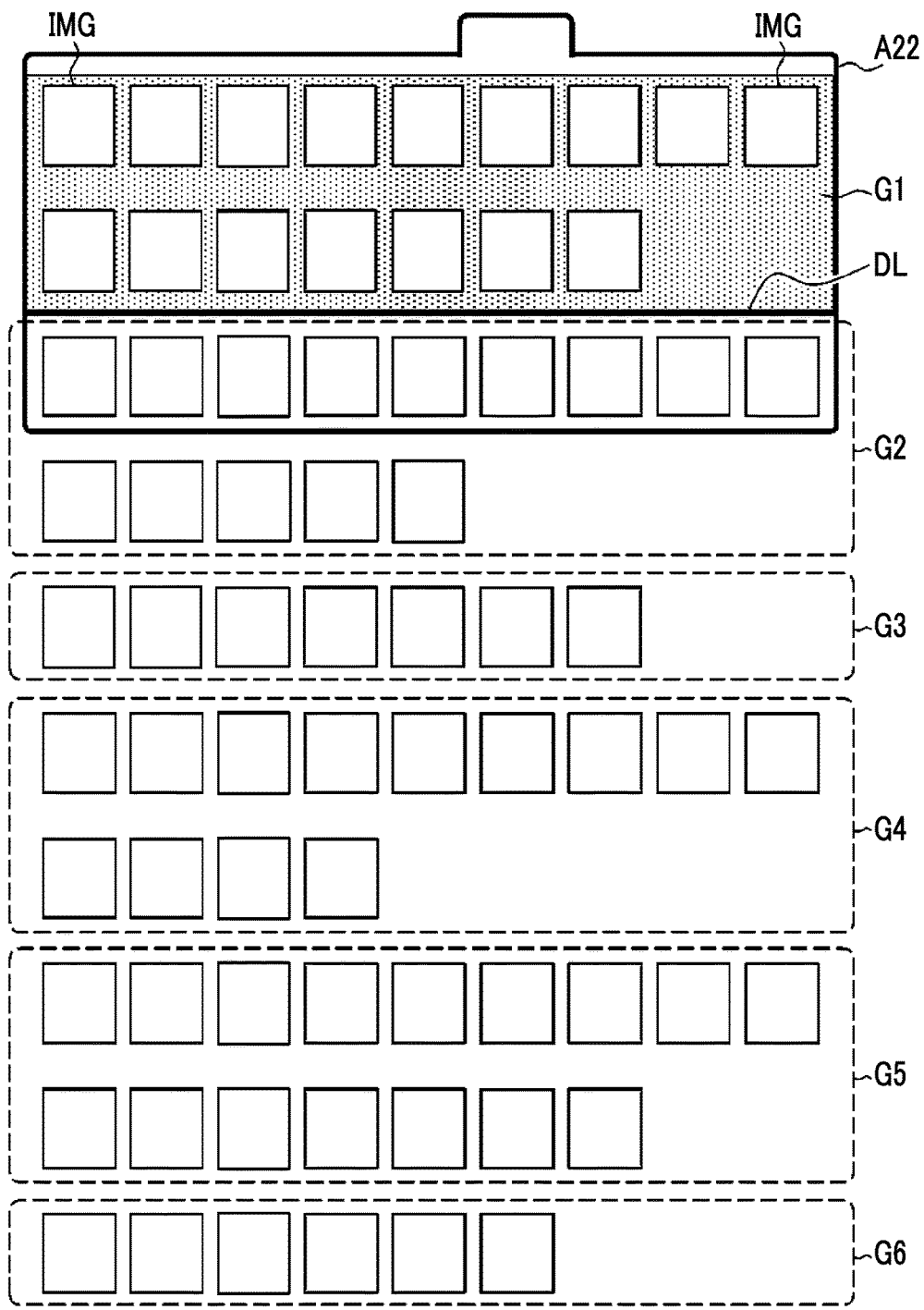
FIG. 7 is a first diagram illustrating page-by-page scrolling.
Figure 8:
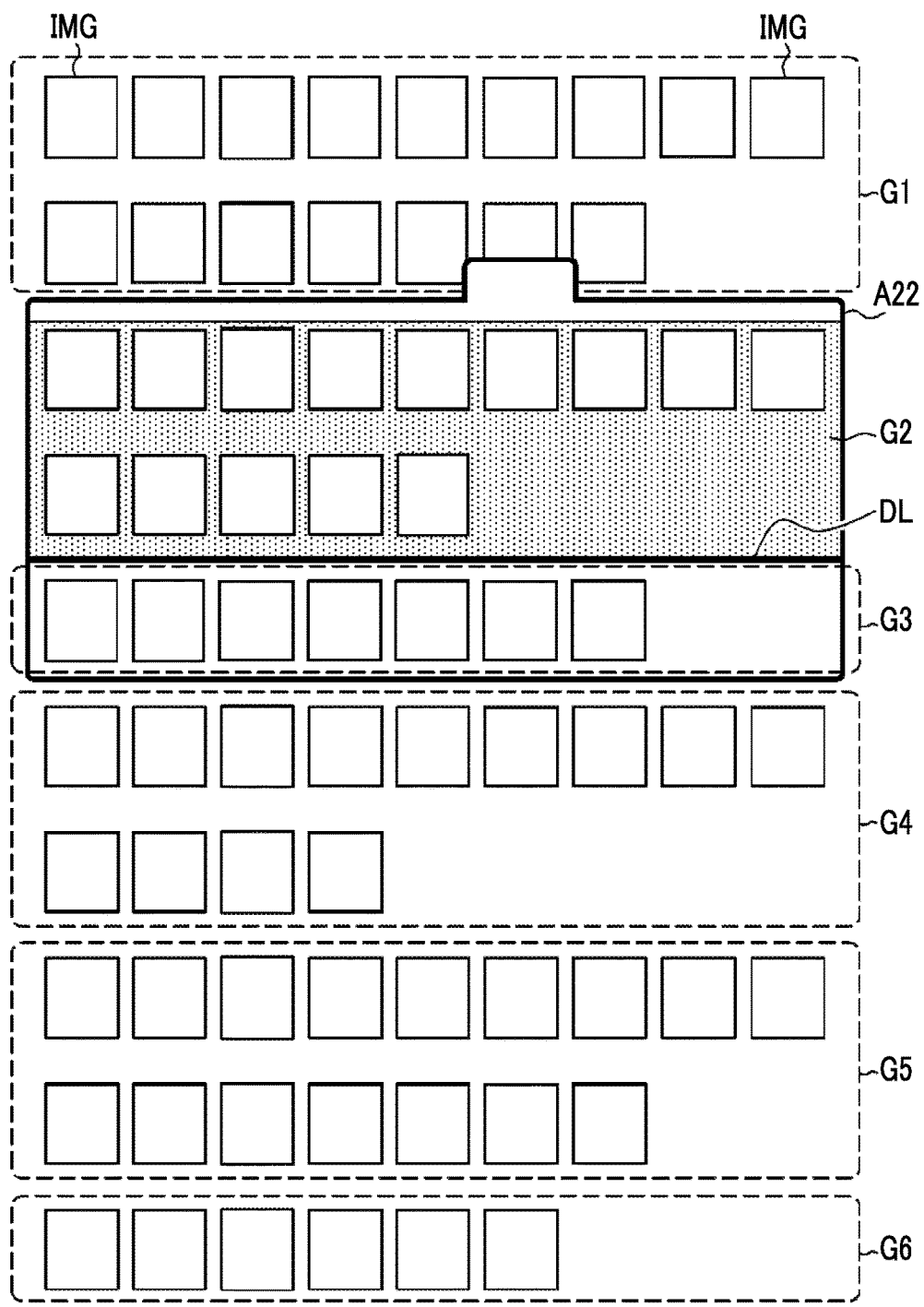
FIG. 8 is a second diagram illustrating page-by-page scrolling.
Figure 9:
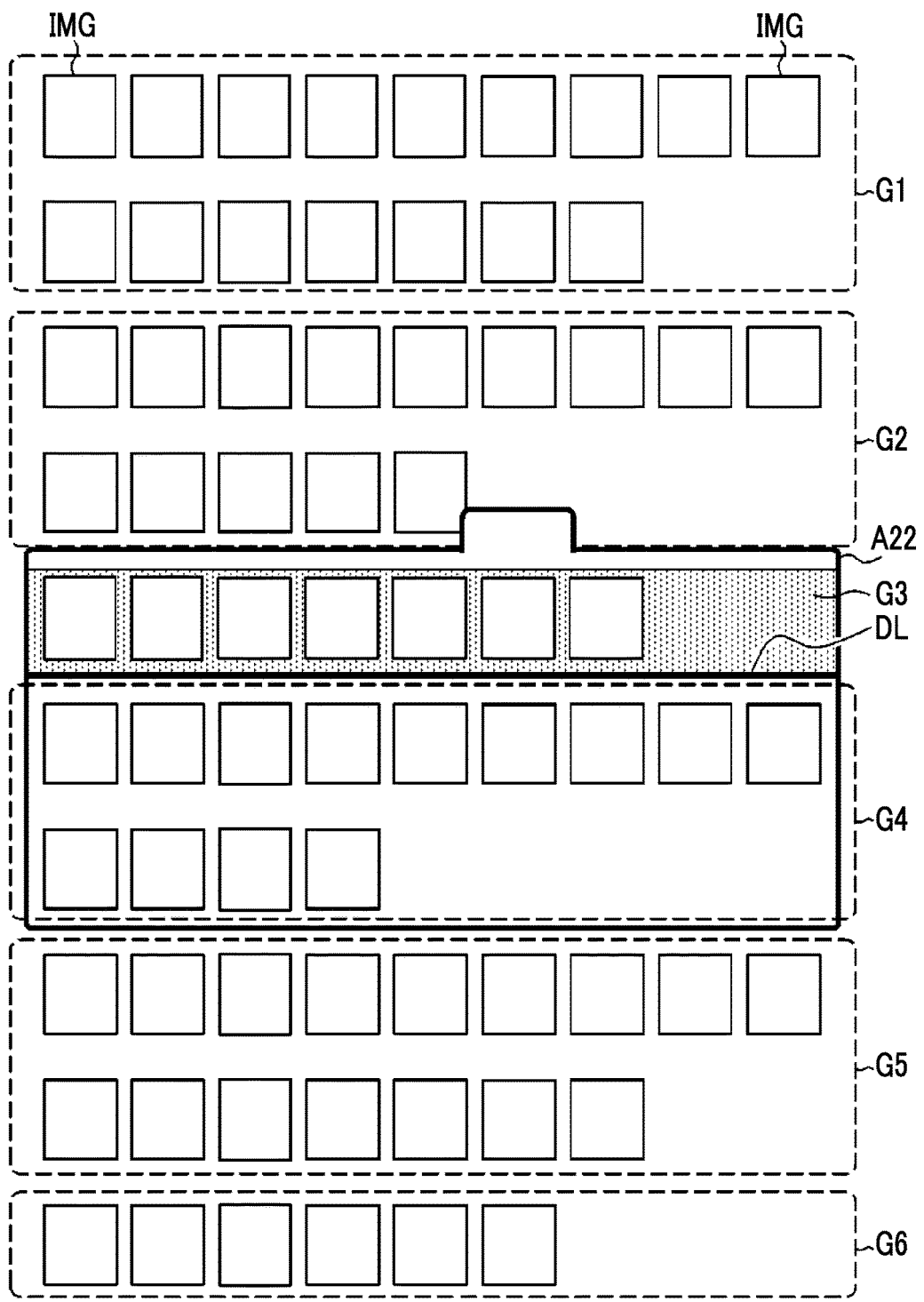
FIG. 9 is a third diagram illustrating page-by-page scrolling.

Page-by-page scrolling will be described with reference to the drawings. As illustrated in FIG. 6, it is assumed that the image classification unit 26 classifies a plurality of images IMG into 6 groups G1, G2, G3, G4, G5, and G6 in units of pages (this example, in units of two facing pages). In addition, it is assumed that the page that is being edited corresponds to the first group G1. In this case, in the second editing screen ES2, an image group corresponding to the first group G1 is displayed at the top (leading position) of the second list display region A22 as illustrated in FIG. 7. In addition, some of the images in the second group G2 are displayed so as to be distinguished from the image group corresponding to the first group G1 by the boundary lines DL. In a case in which the downward page-by-page scroll command button B23 is operated in the state illustrated in FIG. 7, an image group corresponding to the second group G2 is displayed at the top of the second list display region A22 as illustrated in FIG. 8. In addition, the image group corresponding to the third group G3 is displayed so as to be distinguished from the image group corresponding to the second group G2 by the boundary lines DL. In a case in which the downward page-by-page scroll command button B23 is operated in the state illustrated in FIG. 8, an image group corresponding to the third group G3 is displayed at the top of the second list display region A22 as illustrated in FIG. 9. In addition, the image group corresponding to the fourth group G4 is displayed so as to be distinguished from the image group corresponding to the third group G3 by the boundary lines DL.

In a case in which the upward page-by-page scroll command button B24 is operated in the state illustrated in FIG. 9, the image group corresponding to the second group G2 is displayed at the top of the second list display region A22 as illustrated in FIG. 8. In a case in which the upward page-by-page scroll command button B24 is operated in the state illustrated in FIG. 8, the image group corresponding to the first group G1 is displayed at the top of the second list display region A22 as illustrated in FIG. 7.

In this example, the first to sixth groups G1 to G6 are classified on the basis of imaging date and time information attached to each of the plurality of images IMG. The images IMG to which the imaging date and time information is not attached are not classified into the first to sixth groups G1 to G6 and are displayed only when the unclassified image list display command button B142 is operated. All groups include the first to sixth groups G1 to G6 and pages corresponding to the first to sixth groups G1 to G6 are provided. That is, all of the groups correspond to any of the pages. The page-by-page scroll command button B23 or B24 can be operated by one operation to scroll one group and can be operated by a plurality of operations to display the list of all groups. However, the process is not necessarily performed as described above and a list of two or more groups among all of the groups may be displayed.

For example, the images to which the imaging date and time information is not attached may be classified into another group (hereinafter, referred to as an "unclassified group G99") (not illustrated) and pages corresponding to the unclassified group G99 may not be provided. In contrast, the pages corresponding to the unclassified group G99 may be provided and all of the images IMG may correspond to any of the pages.

Fourth, the display control unit 22 distinctively displays an image that has been inserted into a composite image of any one of a plurality of pages and an image that has not been inserted and distinctively displays an image that has been inserted into the composite image of the page that is being edited and an image that has been inserted into a composite image of another page different from the page that is being edited in the second list display region A22 as in the first editing screen ES1.

Fifth, the display control unit 22 distinctively displays an image of which the evaluation value obtained by the image evaluation unit 24 is within the prescribed range and an image of which the evaluation value obtained by the image evaluation unit 24 is beyond the prescribed range in the second list display region A22 as in the first editing screen ES1.

Sixth, in a case in which a command to display another page different from the page that is being edited is received, the display control unit 22 switches display from a state in which the composite image of the page that is being edited is displayed in the second composite image display region A21 and an image group associated with the page that is being edited is preferentially displayed in the second list display region A22 to a state in which a composite image of another page is displayed as a new page that is being edited in the second composite image display region A21 and an image group associated with another page is preferentially displayed in the second list display region A22. However, the page designation button B1 illustrated in FIG. 2 is omitted from the second editing screen ES2 illustrated in FIG. 3. An example in which the page designation button B1 is provided in the second editing screen ES2 will be described below (see FIG. 13).

Seventh, the display control unit 22 displays composite images of pages (hereinafter, referred to as "adjacent pages") with page numbers adjacent to the page number of the page that is being edited so as to be adjacent to the composite image of the page that is being edited.

Next, an example of the replacement of an image by the image editing unit 28 will be described.

The user can input a command to replace an image inserted into the composite image 50 of the page that is being edited with an image which is associated with the page that is being edited and has not been inserted in a state in which the first editing screen ES1 or the second editing screen ES2 is displayed. In a case in which the command input by the user is received, the image editing unit 28 removes the image inserted into the composite image of the page that is being edited from the composite image of the page that is being edited and inserts the image which is associated with the page that is being edited and has not been inserted into the composite image of the page that is being edited.

The user can input a command to replace an image inserted into the composite image 50 of the page that is being edited with an image associated with another page different from the page that is being edited in a state in which the second editing screen ES2 is displayed. In a case in which the image replacement command input by the user is received, the image editing unit 28 removes the image inserted into the composite image 50 of the page that is being edited from the composite image 50 and inserts the image associated with another page into the composite image 50 of the page that is being edited.

The command to replace an image (image replacement command) from the user can be received by, for example, a button (third command receiving unit) on a touch panel.

Next, an example of a composite image editing process to which the image display method according to the embodiment of the invention is applied will be described.

Figure 10:
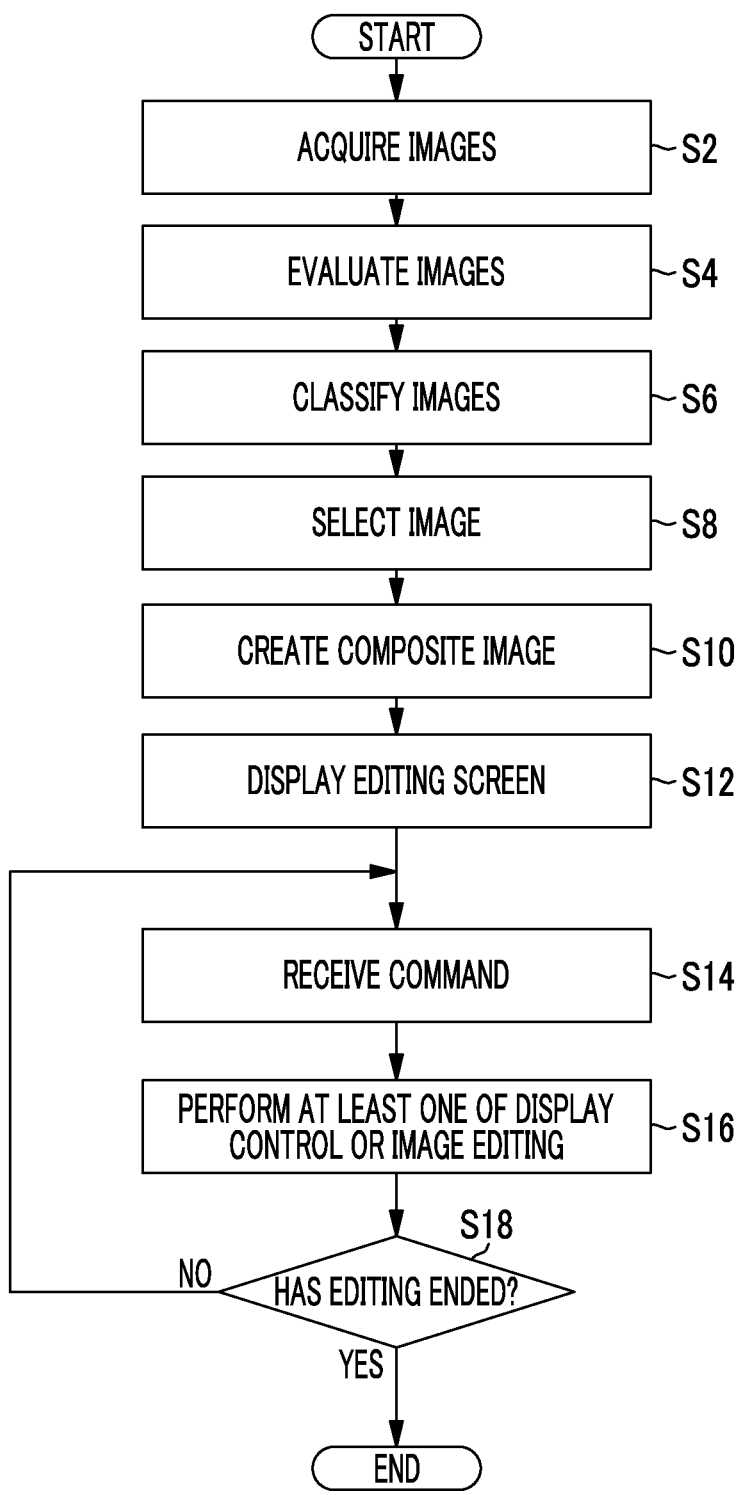
FIG. 10 is a flowchart illustrating the flow of an example of a composite image editing process to which an image display method according to the invention is applied.

FIG. 10 is a flowchart schematically illustrating the flow of the composite image editing process to which the image display method according to the embodiment of the invention is applied. The CPU 20 performs the process according to the program stored in the storage unit 18.

First, the image acquisition unit 12 acquires a plurality of images (Step S2).

Then, the image evaluation unit 24 analyzes each of the acquired plurality of images to acquire the evaluation value of each image (Step S4). The evaluation value is an index for determining whether an image is valuable to the user. Image quality (for example, the degree of blurriness or defocus) is calculated as the evaluation value. Alternatively, the attributes (for example, a size, a position, a direction, and a color) of an object in an image is calculated as the evaluation value. When the object is a person, an evaluation value (for example, a value indicating the degree of smile) indicating the look of the person may be calculated. In addition, a total evaluation value indicating both image quality and the attributes of the object may be calculated.

Then, the image classification unit 26 classifies the acquired plurality of images a plurality of image groups (hereinafter, also referred to as "groups") corresponding to a plurality of pages (Step S6). For example, the images are classified on the basis of image attribute information (for example, information about the imaging date and time or information about an imaging location) added to the images. An object in the images may be detected and the images may be classified on the basis of the attributes of the object. The images may be classified on the basis of both the image attribute information and the detection result of the object.

Then, the image editing unit 28 selects the images (the images to be combined) used for the composite image in each group, on the basis of the calculated evaluation value (Step S8).

Then, the image editing unit 28 arranges the images to be combined in a page-sized template image in each group and creates a composite image of each page (Step S10).

Then, the display control unit 22 displays an editing screen including the composite image and an image list on the display unit 14 (Step S12).

In this example, the display control unit 22 uses one (for example, a first page) of a plurality of pages as an initial page that is being edited and displays, as the first editing screen ES1 illustrated in FIG. 2, the composite image of the page that is being edited and a list of the image groups (page-being-edited image groups) associated with the page that is being edited.

Then, the command receiving unit 16 receives a command from the user (Step S14) and at least one of display control or the editing of the composite image is performed in response to the received user's command (Step S16). Step S16 forms a "display step".

In a case in which the page designation button B1 is operated on the first editing screen ES1, that is, a command to display another page different from the page that is being edited is received, the page corresponding to the command is used as a new page that is being edited and a composite image of the page and a list of image groups associated with the page are displayed in the first editing screen ES1.

In a case in which the editing screen switching command button B61 is operated on the first editing screen ES1, that is, an editing screen switching command is received, the first editing screen ES1 is switched to the second editing screen ES2 illustrated in FIG. 3.

In a case in which the editing screen switching command button B62 is operated on the second editing screen ES2, that is, an editing screen switching command is received, the second editing screen ES2 returns to the first editing screen ES1.

An operation for replacing the image inserted into the composite image 50 of the page that is being edited with the images in the list display regions A12, A22, A32, and A42 can be performed on the editing screens ES1 to ES4.

Figure 11:
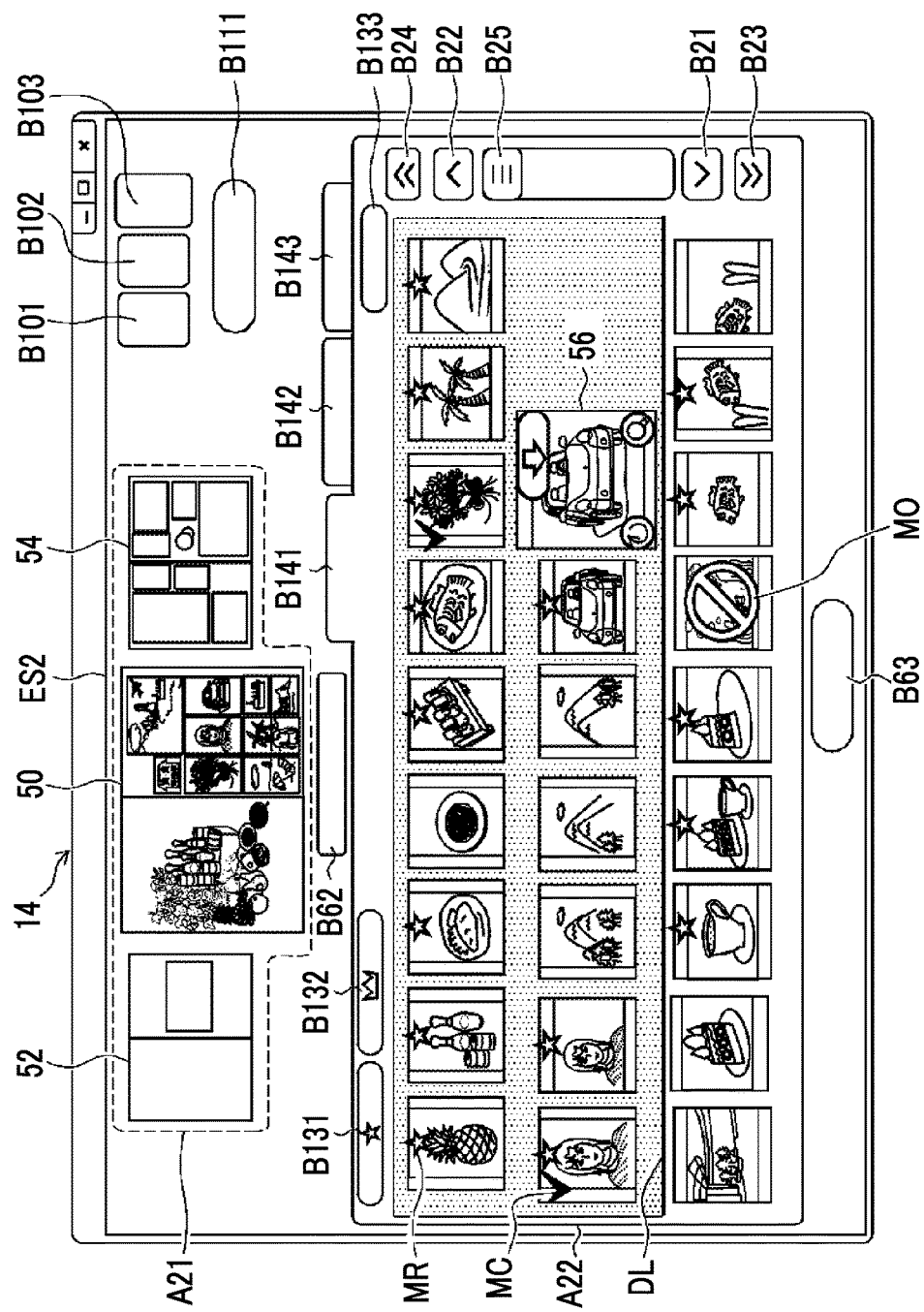
FIG. 11 is a diagram illustrating image replacement.

For example, it is possible to designate a replacement image (replacement target image) from the second list display region A22 on the second editing screen ES2 illustrated in FIG. 3. For example, in a case in which an image (vehicle image) denoted by reference numeral 56 in the second list display region A22 illustrated in FIG. 3 is removed from the composite image 50 illustrated in FIGS. 2 and 3, the image denoted by reference numeral 56 is designated as an image to be removed. FIG. 11 illustrates a state in which a command to remove the image denoted by reference numeral 56 is received. The display control unit 22 enlarges the image denoted by reference numeral 56 to indicate that the command to remove the image has been received. The user designates an image to be inserted as the image denoted by reference numeral 56 into the composite image 50. An image having a star-shaped recommendation mark MR put thereto is a recommended image having an evaluation value in the prescribed range. When the recommended image list display command button B131 is operated, only the recommended image is displayed in the second list display region A22. When the main person image list display command button B132 is operated, only an image including a person detected as the main person is displayed in the second list display region A22. When the page-by-page scroll command button B23 or B24 is operated, scrolling is performed on a page-by-page basis. In a case in which the user wants to scroll slightly, the user uses the scroll command button B21, B22, or B25. Reference numeral B25 indicates a button for inputting a command to scroll slightly.

The user can designate an image to be inserted into the composite image 50 in the second list display region A22. However, a mark with letters MO is put to an image that is being used on other pages. Instead of giving the mark MO, the image may be displayed such that the visibility of the image is lower than that of other images (for example, the image is gray out). In a case in which the user wants to insert an unclassified image into the composite image 50, the user can operate the unclassified image list display command button B142 to operate the replacement on the third editing screen ES3. In a case in which the user wants to insert an added image into the composite image 50, the user operates the additional image list display command button B143 to operate the replacement on the fourth editing screen ES4. It is possible to remove a plurality of images from the composite image 50 at the same time and to insert a plurality of images into the composite image 50. In this example, when the user designates a plurality of images and operates the second editing screen switching command button B62 (an example of a third command receiving unit), image replacement is performed and the editing screen is switched to the first editing screen ES1. In this example, the user operates the second editing screen switching command button B62 to perform image replacement and switching between the editing screens, regardless of the number of images to be replaced. Therefore, it is possible to check a composite image immediately after image replacement in the first composite image display region A11 of the first editing screen ES1.

In a case in which the editing end command button B9 is operated on the first editing screen ES1, that is, an editing end command is received (YES in Step S18), the process ends. In a case in which the editing end command button B9 is not operated (NO in Step S18), the process returns to Step S14. The user can appropriately use various editing screens ES1, ES2, ES3, and ES4 to freely edit the composite image 50 before operating the editing end command button B9.

<Meaning of Image Replacement Between Pages>

According to the image composition device 10 of this embodiment, the use of the second editing screen ES2 makes it possible to easily perform image replacement (image substitution) between pages. The meaning of the image replacement between the pages will be described.

As described with reference to the flowchart illustrated in FIG. 10, the image composition device 10 according to this embodiment can automatically perform image evaluation (Step S4), image classification (Step S6), image selection (Step S8), and the creation of a composite image (Step S10) after acquiring images (Step S2). Therefore, the user only inputs a plurality of images to obtain an image album using an automatic processing function of the image composition device 10.

Figure 12:
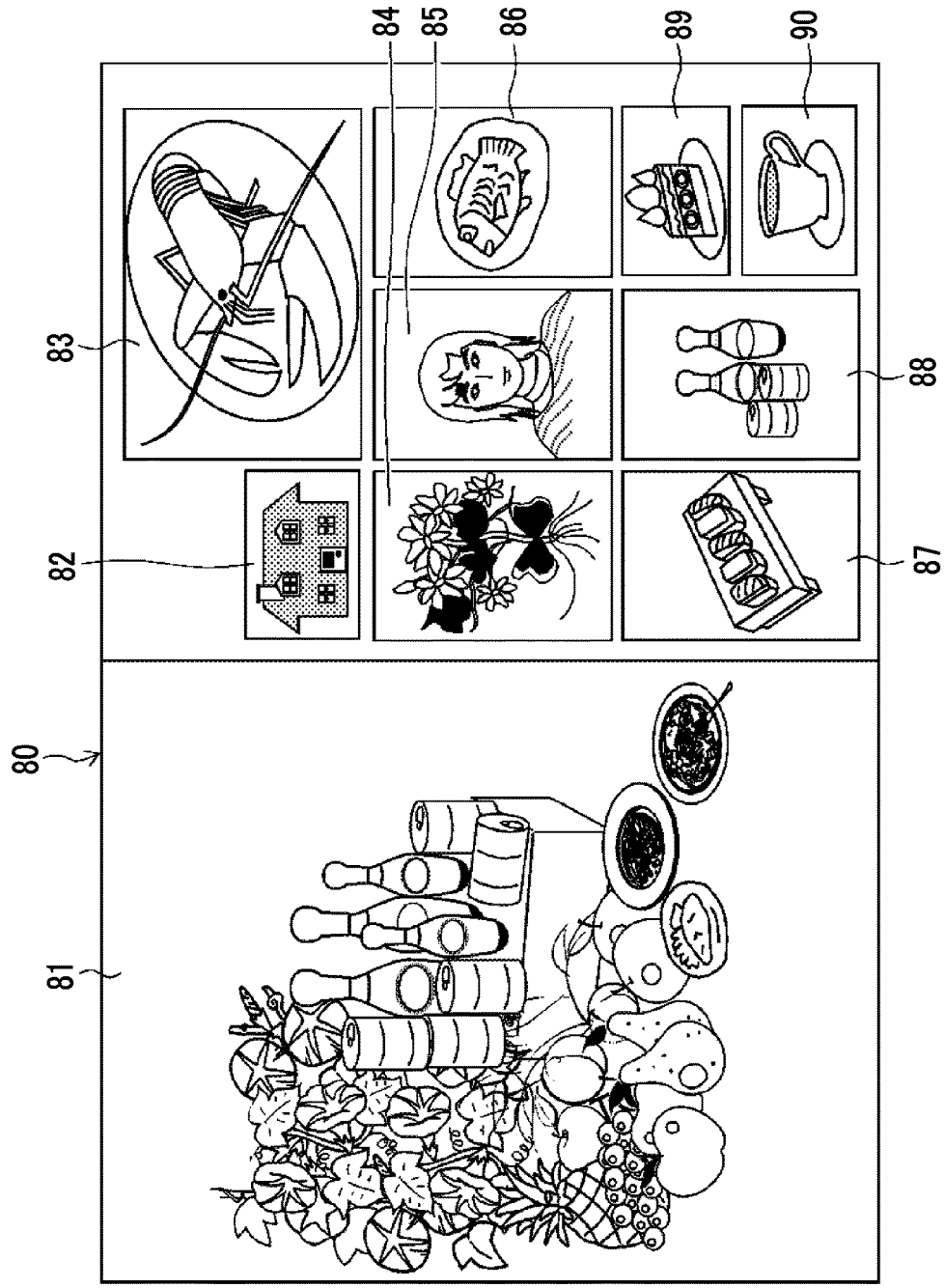
FIG. 12 is a diagram illustrating an example of a composite image with a food theme.

For example, it is assumed that the composite image 50 of one page illustrated in FIG. 2 is created from a plurality of images from the trip by the automatic processing function (Steps S4 to S10). The composite image 50 includes various objects, such as food, buildings, landscapes, flowers, persons, vehicles, and ships. Composite images on other pages are also created by the automatic processing function. In some cases, the user considers that the composite images created by the automatic processing functions are sufficient. In contrast, in some cases, the user wants to arrange his or her favorite composite images. For example, it is considered that the user particularly wants to create composite images with a food theme during the trip. In this case, the user can effectively create the composite images, appropriately using the first editing screen ES1 and the second editing screen ES2. FIG. 12 illustrates a composite image 80 which is arranged from the composite image 50 of one page illustrated in FIG. 2 by the user. In FIG. 12, reference numerals 81, 82, 84, and 85 indicates images which have not been replaced, reference numerals 86, 87, and 88 indicate images related to food which have been replaced in the first editing screen ES1 (food images associated with one page by the automatic processing function), and reference numerals 83, 89, and 90 indicate images related to food which have been replaced in the second editing screen ES2 (food images associated with other pages by the automatic processing function). The image denoted by reference numeral 83 is not illustrated in FIG. 3 and is viewed in the second list display region A22 by a scroll operation. It is possible to designate all of the classified replacement target images 83 and 86 to 90 on the second editing screen ES2.

The user determines the image to be replaced (replacement target image) on the first editing screen ES1 while viewing the composite image 50 of one page and a list of only the image groups associated with the one page on the same screen. Since image groups are associated with the page that is being edited by the automatic processing function, the probability that the user will replace images with favorite images is generally high even when the user refers to only the image groups associated with the page that is being edited. The user determines the image to be replaced (replacement target image) on the second editing screen ES2 while viewing the composite image 50 of one page and a list of a plurality of image groups distinctively displayed in each image group (that is, each page) on the same screen. Therefore, as described with reference to FIGS. 6 to 9, it is possible to effectively perform a replacement operation by scrolling page by page. That is, even in a case in which image replacement between pages is performed, it is possible to easily determine the image to be replaced.

As described above, in a case in which, after the composite image 50 including various objects is created by the automatic processing function, the user wants to create a composite image with a theme related to a favorite object, the image composition device 10 of this embodiment makes it easy to perform an image replacement operation through the second editing screen ES2. Therefore, it is easy to arrange the composite image.

However, for image replacement for the composite image, it is not necessary to perform the image replacement for all of the composite images on a plurality of pages and the image replacement may be performed for only the composite image of a necessary page.

<Variations>

Various variations will be described.

«Reception of Page Command»

There are various variations in an aspect in which a command (page command) to display a page is received.

Figure 13:
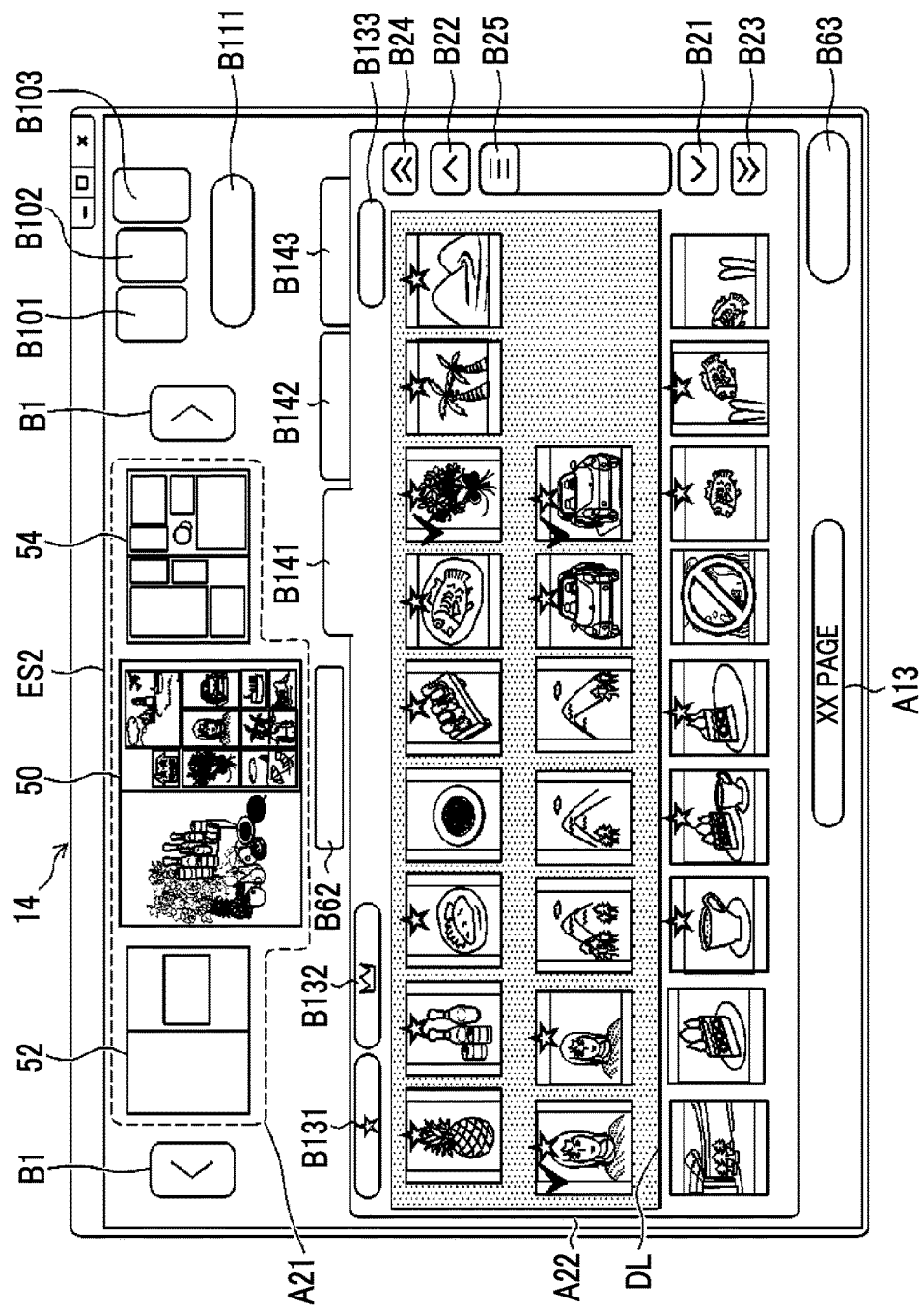
FIG. 13 is a diagram illustrating an example in which a page designation button is provided on the second editing screen.

In FIGS. 3, 4, and 5, the page designation button B1 is omitted. However, for example, the page designation button B1 may be provided on the second editing screen ES2 in addition to the first editing screen ES1. FIG. 13 illustrates an example in which the page designation button B1 is provided on the second editing screen ES2. In a case in which, instead of designating the page designation button B1, composite images 52 and 54 on adjacent pages are designated on the second editing screen ES2, the adjacent pages having the designated composite images may be designated as new pages that are being edited.

The example in which the page designation button B1 for receiving a command to display pages with page numbers adjacent to the page number of the page that is being edited is provided on the first editing screen ES1 has been described above. However, the invention is not limited to the example. A page number may be received.

Figure 14:
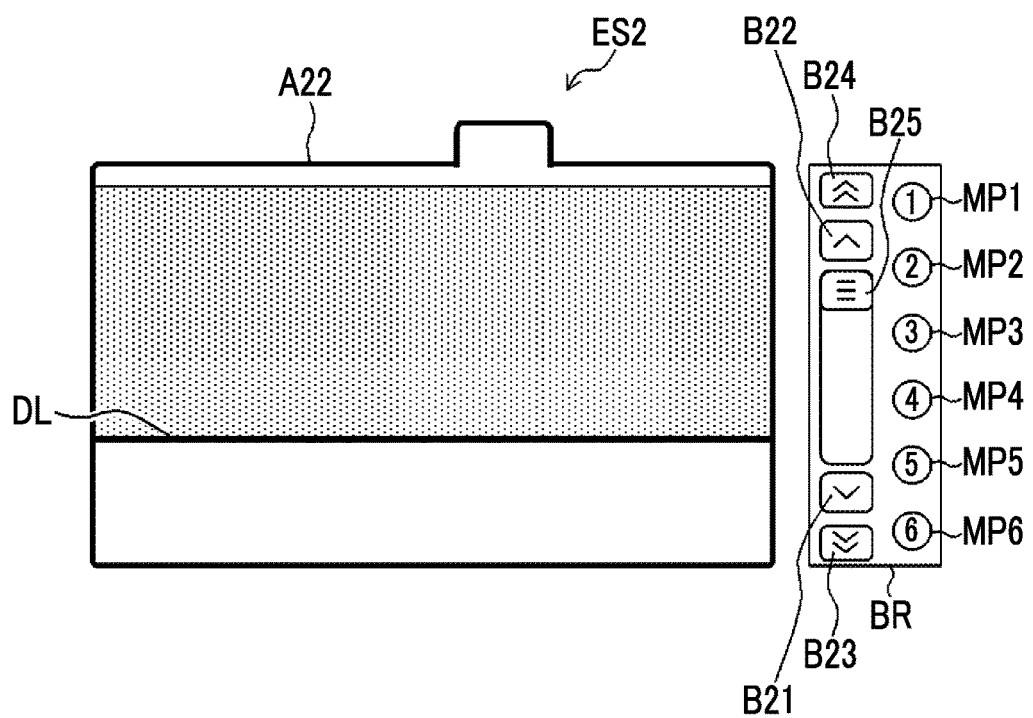
FIG. 14 is a diagram illustrating an example of marks put to each page.

As illustrated in FIG. 14, marks MP1 to MP6 (an example of a first command receiving unit) may be displayed for each page and the designation of each of the marks MP1 to MP6 may be received to receive a command to display the page corresponding to the designated mark. In this example, the marks MP1, MP2, MP3, MP4, MP5, and MP6 corresponding to the pages from the first page to the sixth page among a plurality of pages of an image album are arranged in a bar BR in which various scroll command buttons B21, B22, B23, B24, and B25 are provided. However, the marks may be icons, symbols, or letters.

In a case in which the marks MP1 to MP6 are operated on the second editing screen ES2, an image group associated with the designated page is displayed at the leading position (this example, the top) of the second list display region A22.

«Re-layout»

A case in which a layout process starts automatically as the layout process of the image editing unit 28 has been described above. However, the layout process may start in response to a command from the user.

For example, a layout change command button B112 (fourth command receiving unit) receives a re-layout command on the first editing screen ES1 illustrated in FIG. 2. The image editing unit 28 performs the rearrangement (re-layout) of images in the composite image of each page in response to the re-layout command received by the layout change command button B112. The layout change command button B112 may be provided on the second editing screen ES2 illustrated in FIG. 3.

«Manual Group Editing»

An automatic group editing function has been described as the group editing function of the group editing unit 30. However, it is possible to associate pages with images in response to a command from the user (manual group editing). That is, the group editing unit 30 edits the association between pages and images for each page in response to the group editing command received from the user. For example, the group editing command button B116 (an example of a fifth command receiving unit) is provided on the first editing screen ES1 illustrated in FIG. 2 and the second editing screen ES2 illustrated in FIG. 3. The group editing command button B116 receives a command to edit a group (group editing command) from the user. The group editing unit 30 edits the association between the page and the image for each page in response to the group editing command received by the group editing command button B116.

The embodiment of the invention has been described above. However, the invention is not limited to the above-described embodiment and the modification examples thereof and can be modified in various ways without departing from the scope and spirit of the invention.

EXPLANATION OF REFERENCES

10: image composition device
12: image acquisition unit
14: display unit
16: command receiving unit
18: storage unit
20: CPU
22: display control unit
24: image evaluation unit
26: image classification unit
28: image editing unit
30: group editing unit
50, 52, 54, 80: composite image
A11: first composite image display region
A12: first list display region
A13: page information display region
A21: second composite image display region
A22: second list display region
A31: third composite image display region
A32: third list display region
A41: fourth composite image display region
A42: fourth list display region
B1: page designation button
B101: list screen command button
B102: editing screen command button
B103: enlargement command button
B111: date display command button
B112: layout change command button
B113: background color change command button
B114: color correction command button
B115: comment input command button
B116: group editing command button
B121: first return command button
B122: second return command button
B123: temporary storage command button
B131: image list display command button
B132: main person image list display command button
B133: image addition command button
B141: classified image list display command button
B142: unclassified image list display command button
B143: additional image list display command button
B21, B22: row-by-row scroll command button
B23, B24: page-by-page scroll command button
B25: slight scroll command button
B61: first editing screen switching command button
B62, B63: second editing screen switching command button
B9: editing end command button
BR: bar
DL: boundary line
ES1: first editing screen
ES2: second editing screen
ES3: third editing screen
ES4: fourth editing screen
G1, G2, G3, G4, G5, G6: group
IMG: image
MC: check mark
MO: mark indicating image being used in another page
MP1, MP2, MP3, MP4, MP5, MP6: mark
MR: recommendation mark

What is claimed is:

1. An image display device comprising:
a display unit;
a user interface device configured to receive a command to display one page among a plurality of pages; and
a processor configured to display a composite image of the one page indicated by the user interface device and a list of a plurality of image groups associated with the plurality of pages on the display unit at the same time, wherein
the processor is further configured to distinctively display two or more image groups among the plurality of image groups in the list and preferentially display an image group associated with the one page in the list,
the processor is further configured to edit the composite image of the one page,
the user interface device is further configured to receive an image replacement command for the composite image of the one page,
in a case in which the user interface device receives a command to replace an image in the composite image of the one page with an image associated with another page different from the one page, the processor is further configured to delete the image inserted into the composite image of the one page and insert the image associated with another page into the composite image of the one page, and
the processor is further configured to display a page that is being edited on the display unit.

2. The image display device according to claim 1, wherein the processor displays composite images of pages with page numbers adjacent to the page number of the one page so as to be adjacent to the composite images of the one page.

3. The image display device according to claim 2, wherein,
in a case in which the user interface device receives a command to display another page different from the one page, the processor switches display from a state in which the composite image of the one page is displayed and an image group associated with the one page is preferentially displayed in the list to a state in which a composite image of another page is displayed and an image group associated with another page is preferentially displayed in the list.

4. The image display device according to claim 2, wherein the processor displays a mark corresponding to each of the plurality of pages, and the user interface device receives a command for the mark corresponding to each of the plurality of pages to receive a command to display the page corresponding to the mark indicated by the command.

5. The image display device according to claim 1, wherein,
in a case in which the user interface device receives a command to display another page different from the one page, the processor switches display from a state in which the composite image of the one page is displayed and an image group associated with the one page is preferentially displayed in the list to a state in which a composite image of another page is displayed and an image group associated with another page is preferentially displayed in the list.

6. The image display device according to claim 1, wherein
the processor displays a mark corresponding to each of the plurality of pages, and
the user interface device receives a command for the mark corresponding to each of the plurality of pages to receive a command to display the page corresponding to the mark indicated by the command.

7. The image display device according to claim 1, wherein
the user interface device receives a command to scroll the list page by page, and
the processor displays the image group in the list so as to be scrolled page by page in response to the page-by-page scroll command received by the user interface device.

8. The image display device according to claim 1, wherein
the processor displays boundary lines that separate the image group into pages in the list.

9. The image display device according to claim 1, wherein
the processor distinctively displays an image that has been inserted into a composite image of any one of the plurality of pages and an image that has not been inserted into any of the plurality of pages in the list and distinctively displays an image that has been inserted into the composite image of the one page and an image that has been inserted into a composite image of another page different from the one page in the list.

10. The image display device according to claim 1, wherein
the processor analyzes each of a plurality of images to calculate an evaluation value of each image, and
the processor distinctively displays an image having an evaluation value in a prescribed range and an image having an evaluation value beyond the prescribed range in the list.

11. The image display device according to claim 1, wherein
the user interface device receives a re-layout command for the composite image, and
the processor rearranges the images in the composite image of each page in response to the re-layout command received by the user interface device.

12. The image display device according to claim 1, wherein
the user interface device receives a group editing command for the image group; and
the processor edits association between the page and images in the image group for each page in response to the group editing command received by the user interface device.

13. The image display device according to claim 1, wherein
the user interface device receives an editing screen switching command to switch an editing screen between a first editing screen on which the composite image of the one page and the list of the image groups associated with the one page are displayed at the same time and a second editing screen on which the composite image of the one page and the list of the plurality of image groups are displayed at the same time,
a display size of the composite image of the one page in the second editing screen is less than a display size of the composite image of the one page in the first editing screen,
a display size of the list of the plurality of image groups in the second editing screen is greater than a display size of the list of the image groups associated with the one page in the first editing screen, and
the processor changes a ratio of the display size of the composite image of the one page to the display size of the list of the image groups associated with the one page in the first editing screen and a ratio of the display size of the composite image of the one page to the display size of the list of the plurality of image groups in the second editing screen, in response to the editing screen switching command.

14. The image display device according to claim 1, wherein
the processor displays the image group associated with the one page at a leading position of the list in one direction on a screen of the display unit to preferentially display the image group associated with the one page in the list.

15. The image display device according to claim 1, wherein
the processor makes at least one of a display mode of the image group associated with the one page or a display mode of a background of the image group associated with the one page different from a display mode of an image group associated with another page different from the one page or a display mode of a background of the image group associated with another page different from the one page to preferentially display the image group associated with the one page in the list.

16. The image display device according to claim 1, wherein
a unit of the page is two facing pages or a single page.

17. The image display device according to claim 1, wherein,
in a case in which the user interface device receives the command to replace an image in the composite image of the one page with an image associated with another page different from the one page, the processor is further configured to delete the image inserted into the composite image of the one page and insert the image associated with another page into the composite image of the one page and not inserted into any page.

18. An image display method comprising:
receiving a command to display one page among a plurality of pages;
displaying a composite image of the one page and a list of a plurality of image groups associated with each of the plurality of pages at the same time;
editing the composite image of the one page;
receiving an image replacement command for the composite image of the one page;
in a case of receiving a command to replace an image in the composite image of the one page with an image associated with another page different from the one page, deleting the image inserted into the composite image of the one page and inserting the image associated with another page into the composite image of the one page; and displaying a page that is being edited, wherein, in the display of the composite image and the list, two or more image groups among the plurality of image groups are distinctively displayed in the list and an image group associated with the one page is preferentially displayed in the list.

19. A computer-readable non-transitory recording medium storing a program that causes a computer to perform:

receiving a command to display one page among a plurality of pages;

displaying a composite image of the one page and a list of a plurality of image groups associated with each of the plurality of pages at the same time;

editing the composite image of the one page;

receiving an image replacement command for the composite image of the one page;

in a case of receiving a command to replace an image in the composite image of the one page with an image associated with another page different from the one page, deleting the image inserted into the composite image of the one page and inserting the image associated with another page into the composite image of the one page; and displaying a page that is being edited, wherein, in the display of the composite image and the list, two or more image groups among the plurality of image groups are distinctively displayed in the list and an image group associated with the one page is preferentially displayed in the list.

* * * * *